Patented Mar. 4, 1930

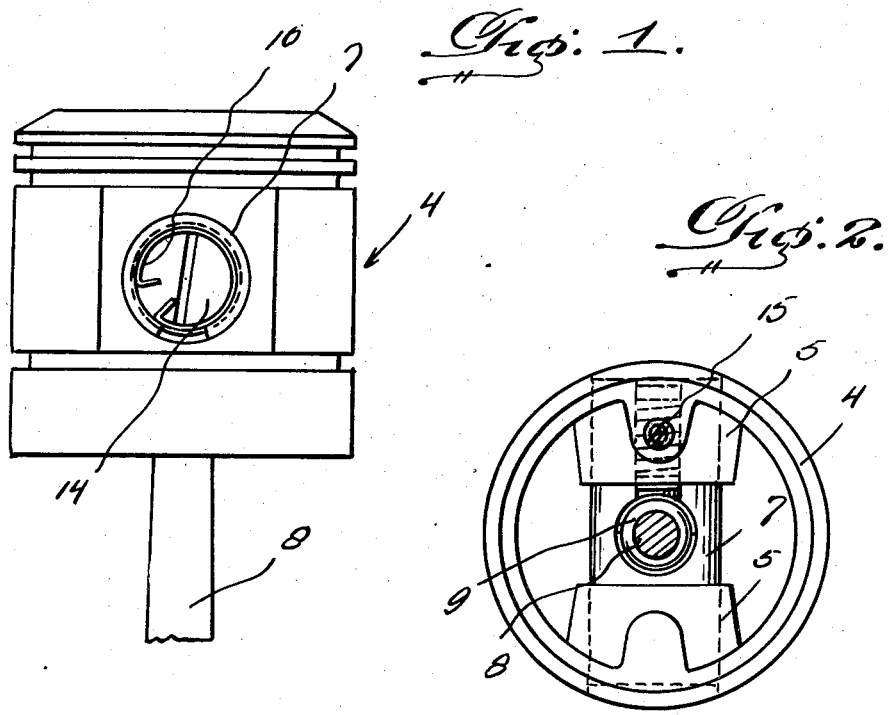
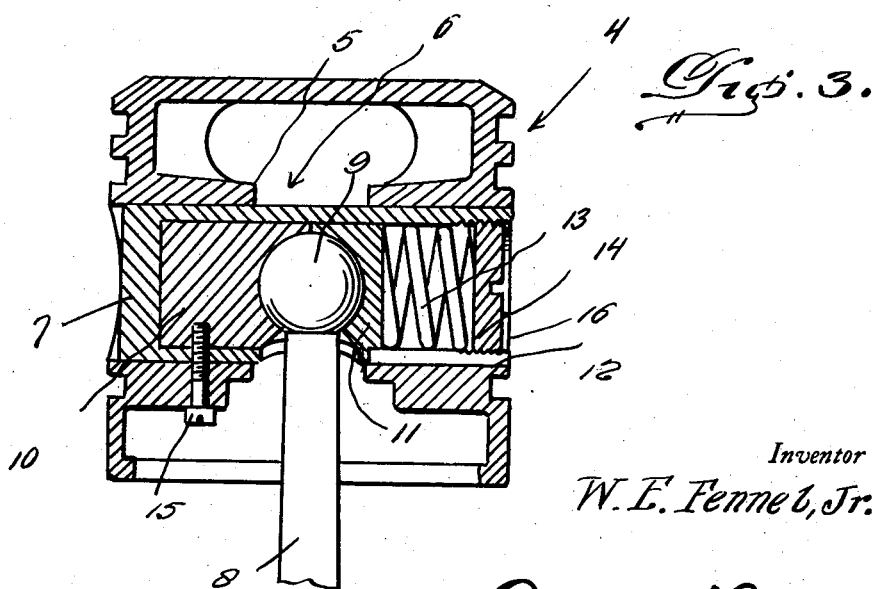

1,749,024

UNITED STATES PATENT OFFICE

WILLIAM E. FENNEL, JR., OF MOBERLY, MISSOURI

PISTON PIN

Application filed May 7, 1928. Serial No. 275,839.

The present invention relates to an improved piston pin constructed to permit a universal or ball and socket connection to be had between the piston head and the crank shaft connecting rod. I am aware that it is not broadly new in the art to provide a ball and socket connection between a connecting rod and a piston head, and I appreciate that this arrangement is provided for more evenly distributing strains and stresses, and to secure a desirable flexibility of action of the piston head to avoid undue wear and to insure better alignment.

What I aim to do, therefore, is to provide a structure which assures maintenance of these advantages and results, but which is characterized by a novel adaptation of parts cooperating to provide a new contribution to this art, which it is believed, will better fulfill the requirements of a structure of this class.

Stated, in another way, I have evolved and produced a novel piston pin and ball and socket joint, which is an improvement upon known prior art devices, and one which is regarded as superior from the standpoint of the manufacturer and the user.

In the drawings:

Figure 1 is a side elevational view of a piston embodying my improvement.

Figure 2 is a bottom plan view of the same.

Figure 3 is a view on an enlarged scale, in section and elevation, detailing the association of parts more plainly.

The piston head 4 is of customary design and it is provided with an inwardly extending spaced bushing 5, to receive the improved piston pin 6. The piston pin, in this instance, comprises a cylinder 7, closed at the left hand end and open at the right hand end, and being internally screw threaded at the last named end. On one side and at the center, the cylinder is provided with an opening to permit passage of the upper end portion of the connecting rod 8. In this instance the connecting rod is provided with a ball joint connector 9.

Arranged within the cylinder 7 is a sectional filler or core, one section being designated by the numeral 10, and the complemental section by the numeral 11. These are disposed in abutting relation and the adjacent faces are formed with semi-spherical recesses, which cooperate in providing a complete spherical socket for reception of the ball joint connector 9. The section 11 is provided with a key slidable in a keyway 12 and it is pressed against the connector 9 through the medium of a strong coiled spring 13. The spring is held in place by a screw plug or cap 14. This is equipped with a screw driver kerf or a retention wire 15 of appropriate construction is associated therewith to guard against accidental displacement.

It is yet to be pointed out that a screw 15 is provided and is connected with one of the bushings 5 to hold the complete piston in place.

As before stated, it is thought that a piston pin of this construction is superior to corresponding parts of prior art devices, in that it is characterized by greater flexibility, compactness and convenience in arrangement of parts, and easy of assembly and repair. These and other advantages and features have doubtless been made apparent from the description and drawings, and therefore a more lengthy description is regarded as unnecessary.

Minor changes in the shape, size and arrangement coming within the field of invention claimed may be resorted to, if desired.

I claim:

1. As a new product of manufacture, a piston pin comprising a cylinder closed at one end, a sectional core arranged in said cylinder and embodying relatively stationary and movable sections, said sections having their adjacent portions provided with semi-spherical recesses cooperating in producing a spherical socket for connection of a ball joint connector, together with spring means arranged in one end portion of the cylinder and cooperable with the relatively movable section.

2. As a new product of manufacture, a piston pin comprising a cylinder closed at one end and open and internally screw threaded at its opposite end, said cylinder being provided intermediate its ends with a connecting rod opening, cylindrical block-like core sections arranged within said cylinder, a retaining screw for one section to render it relatively stationary with respect to the complemental section, said core sections having their adjacent portions provided with opposed semi-spherical recesses forming a ball socket, a coil spring arranged in said cylinder and in contact with the relatively moveable core section, and a screw plug threaded into the screw threaded end portion of the cylinder and engaging said spring.

In testimony whereof I affix my signature.

WILLIAM E. FENNEL, Jr.